(12) United States Patent
Jo et al.

(10) Patent No.: US 9,838,107 B2
(45) Date of Patent: Dec. 5, 2017

(54) MULTIPLE BEAMFORMING TRAINING

(71) Applicant: LG ELECTRONICS INC., Seoul (KR)

(72) Inventors: Kyungtae Jo, Seoul (KR); Hangyu Cho, Seoul (KR); Jinmin Kim, Seoul (KR); Eunsung Park, Seoul (KR); Sungjin Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/295,736

(22) Filed: Oct. 17, 2016

(65) Prior Publication Data
US 2017/0111099 A1    Apr. 20, 2017

Related U.S. Application Data (60) Provisional application No. 62/242,315, filed on Oct. 16, 2015, provisional application No. 62/251,601, filed on Nov. 5, 2015, provisional application No. 62/252,425, filed on Nov. 7, 2015, provisional application No. 62/252,449, filed on Nov. 7, 2015.

(51) Int. Cl.
*H04L 1/02* (2006.01)
*H04B 7/06* (2006.01)

(52) U.S. Cl.
CPC ......... *H04B 7/0684* (2013.01); *H04B 7/0617* (2013.01); *H04B 7/0619* (2013.01)

(58) Field of Classification Search
CPC ..... H04L 1/0618; H04L 1/06; H04L 27/2647; H04B 7/0417
USPC ........ 375/267, 260, 347; 370/252, 310, 328; 455/41.2
See application file for complete search history.

(56) References Cited

U.S. PATENT DOCUMENTS

| | | | | |
|---|---|---|---|---|
| 2011/0211490 | A1* | 9/2011 | Nikula | H04B 7/086 370/252 |
| 2013/0130624 | A1* | 5/2013 | Maltsev | H01Q 3/26 455/41.2 |
| 2015/0208436 | A1* | 7/2015 | Seok | H04W 74/08 370/329 |
| 2016/0337968 | A1* | 11/2016 | Park | H04W 52/0216 |

* cited by examiner

*Primary Examiner* — Khai Tran
(74) *Attorney, Agent, or Firm* — Lee Hong Degerman Kang Waimey (57) ABSTRACT

A method for performing a multi-beamforming training and a device using the same are provided. An initiator transmits a first beacon frame for beamforming training on a first channel during a sector sweep and transmits a second beacon frame for beamforming training on a second channel during the sector sweep. The first beacon frame comprises a multi-channel indicator that indicates that beamforming training is performed on the first and second channels.

12 Claims, 14 Drawing Sheets

Channel A

| L-STF | L-CEF | L-Header | DATA FIELD | AGC | TRN |
|---|---|---|---|---|---|

⋮

Channel B

| L-STF | L-CEF | L-Header | DATA FIELD | AGC | TRN |
|---|---|---|---|---|---|

| L-STF | L-CEF | L-Header | EDMG-Header-A | EDMG-STF | EDMG-CEF | DATA FIELD | AGC | TRN |

MULTIPLE BEAMFORMING TRAINING

CROSS-REFERENCE TO RELATED APPLICATIONS

Pursuant to 35 U.S.C. §119(e), this application claims the benefit of U.S. Provisional Application No. 62/242,315, filed on Oct. 16, 2015, 62/251,601, filed on Nov. 5, 2015, 62/252,425, filed on Nov. 7, 2015 and 62/252,449, filed on Nov. 7, 2015, the contents of which are all hereby incorporated by reference herein in their entirety.

BACKGROUND OF THE INVENTION

Field of the Invention

The present disclosure relates to a wireless communication system, and more particularly, to a method of performing multi-beamforming training and a device using the same Related Art An IEEE 802.11 ad standard is a very high-speed wireless communication standard that operates in a band of 60 GHz or above. Even though a signal can reach about 10 meters, the throughput may support 6 Gbps or more. Since the IEEE 802.11 ad standard operates in a high frequency band, signal propagation is dominated by ray-like propagation. As a transmit (TX) or receive (RX) antenna beam is arranged toward a strong spatial signal path, signal quality thereof may be improved.

The IEEE 802.11 ad standard includes a beamforming training process for antenna beam alignment. To achieve throughput of 20 Gbps or more, a next-generation standard that is being developed on the basis of the IEEE 802.11ad is called as an IEEE 802.11 ay. One of the key technologies of the IEEE 802.11ay is a multiple input multiple output (MIMO) beamforming technology through an array antenna. The IEEE 802.11ad as a conventional technology supports a single stream transmission using one array antenna, and a next-generation technology (e.g. IEEE 802.11ay) thereof supports multi-stream transmission using a plurality of antenna arrays.

To apply the plurality of array antennas, it is required that a plurality of independent beamformings are performed. However, this may cause severe interference between a plurality of streams and an increase of time required for the beamformings. A method will be proposed to minimize the interference between the streams and reduce the time required for the beamformings.

SUMMARY OF THE INVENTION

The present invention provides a method of performing multiple beamforming training using multi-channel.

In an aspect, a method of performing a multi-beamforming training in a wireless local area network (LAN) is provided. The method includes transmitting, by an initiator, a first beacon frame for beamforming training on a first channel during a sector sweep, and transmitting, by the initiator, a second beacon frame for beamforming training on a second channel during the sector sweep. The first beacon frame comprises a multi-channel indicator that indicates that beamforming training is performed on the first and second channels.

In another aspect, a device for performing a multi-beamforming training in a wireless local area network is provided. The device includes a transceiver configured to receive and transmit a radio signal, and a processor operatively coupled with the transceiver. The processor is configured to transmit a first beacon frame for beamforming training on a first channel during a sector sweep, and transmit a second beacon frame for beamforming training on a second channel during the sector sweep. Th first beacon frame comprises a multi-channel indicator that indicates that beamforming training is performed on the first and second channels.

It may be possible to perform a plurality of beamforming training at the same time, thereby reducing the time for the beamforming training.

DESCRIPTION OF EXEMPLARY EMBODIMENTS

Below, a wireless communication system that operates at a frequency band of 60 GHz or 45 GHz or above will be exemplarily described. A plurality of channels may be provided. For example, one channel may have a bandwidth of 2.16 GHz.

A station (STA) may be referred to as various names such as a wireless device, a mobile station (MS), a network interface device, a wireless interface device, or a user.

A Basic service set (BSS) is a building block of the wireless local area network (WLAN) based on the IEEE 802.11 standard. The BSS may include a plurality of STAs which perform direct communication with each other. The WLAN may provide two types of sets, for example, independent BSS (IBSS) and personal BSS (PBSS). The IBSS may be a basic type. The PBSS may be a type of wireless local area network (WLAN), in which the respective STAs communicate directly with each other, as an ad-hoc network. A STA in the PBSS may perform a role of the PBSS control point (PCP). The PCB may provide a beacon transmission, a service period (SP) allocation, etc.

An access point (AP) may be an entity which provides a connection (or association) between multiple BSSs. One STA in the PBSS may perform a role of the AP and another STA that belongs to different BSSs may communicate through the AP. The AP may manage the beacon transmission and association (or association response). Hereinafter, the AP and the PCP, which are not divided separately, may be referred to as a "AP".

The STA may include non-AP STA or AP unless a STA function and an AP function are divided separately. When a communication between the STA and the AP is described, the STA may be interpreted as the non-AP STA. When a communication between a STA and a STA is described or when the AP function is not required separately, the STA may be the non-AP STA or the AP.

Figure 1:
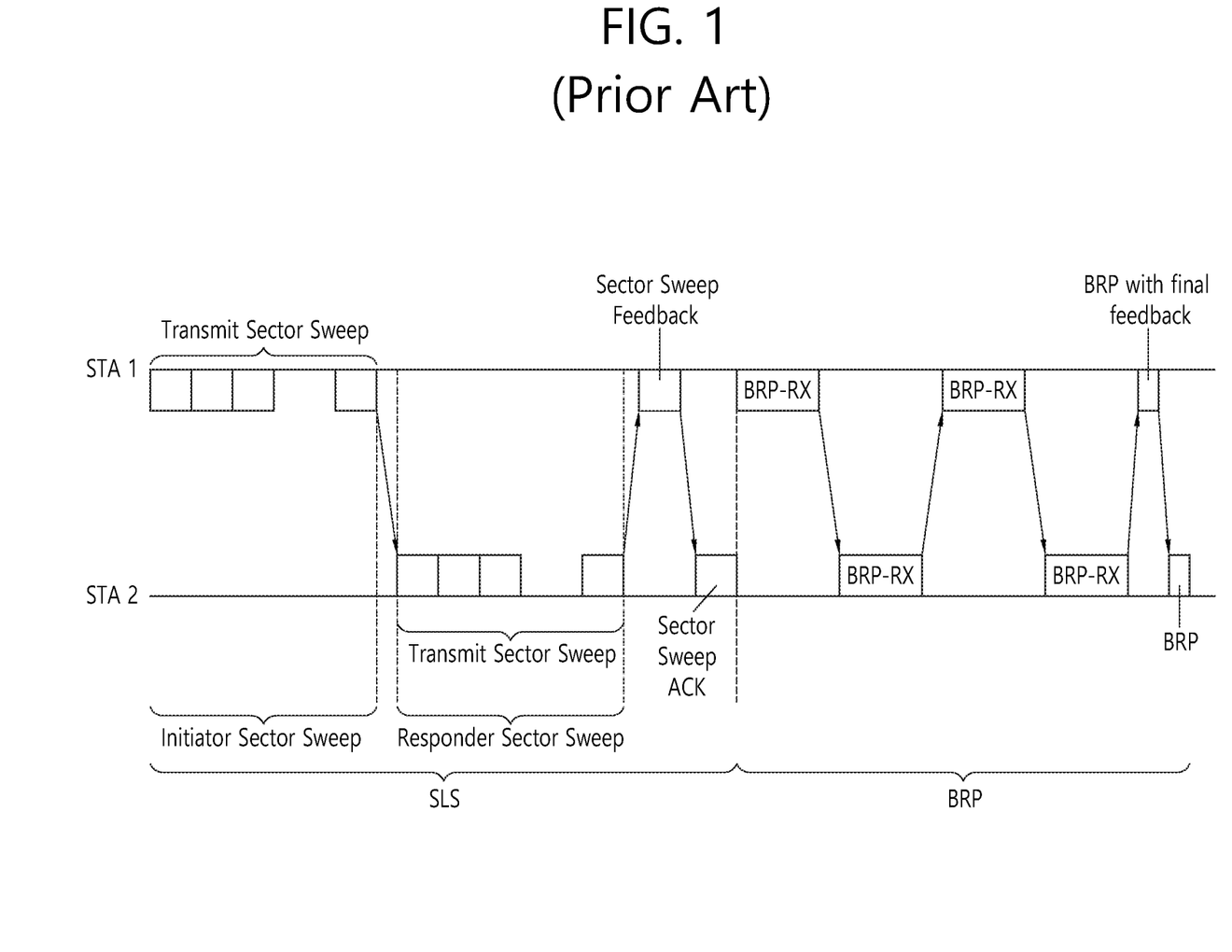
FIG. 1 is a diagram illustrating a beamforming training process according to the related art.

FIG. 1 is a diagram illustrating a beamforming training process according to the related art. This may refer to section 9.35 of the IEEE 802.11 ad standard. A STA1 may be an initiator that initiates beamforming (BF) training. A STA2 that participates in the BF training may be a responder.

The BF training provides a transmission of a BF training frame using a sector sweep (SSW) and a signaling required for each STA to determine setting an appropriate antenna system. The BF training process may include a sector level sweep (SLS) process and a beam refinement protocol (BRP) process. The SLS process for the sector sweep may allow communication between the STAs to provide a control physical layer (PHY). The BRP process provides a refinement of an antenna weight vector between the transmitter and the receiver.

The BF training may be initiated by the initiator from the SLS process. The SLS process may include an initiator sector sweep (ISS) for training an initiator link, a responder sector sweep (RSS) for training a responder link, a sector sweep (SSW) feedback, and a SSW ACK.

During the ISS process, the initiator may transmit each frame (a beacon frame or a SSW frame) to each of the sectors which the initiator has. During the RSS process, the responder may transmit each of the SSW frames to each of the sectors which the responder has. During the SSW process, the initiator may send a SSW feedback frame to the responder. The SSW feedback frame may include information about a sector and an antenna which are selected by the initiator. The SSW ACK frame may be transmitted through a sector included in the SSW feedback frame which is most recently received and the antenna.

A sector may correspond to a specific antenna beam or pattern. A transmit (TX) sector may be a sector for a TX antenna, and a receive (RX) sector may be a sector for a RX antenna.

A sector (a TX sector and/or a RX sector) in which an initiator has the best quality and a sector (a TX sector and/or a RX sector) in which a responder has the best quality may be determined through the SLS process.

When the SLS process is completed, the BRP process for training an RX antenna array and a TX antenna array may be initiated. The BRP process may include a BRP setup subphase, a multiple sector ID detection (MID) subphase, a beam combining (BC) subphase, and the like.

Figure 2:
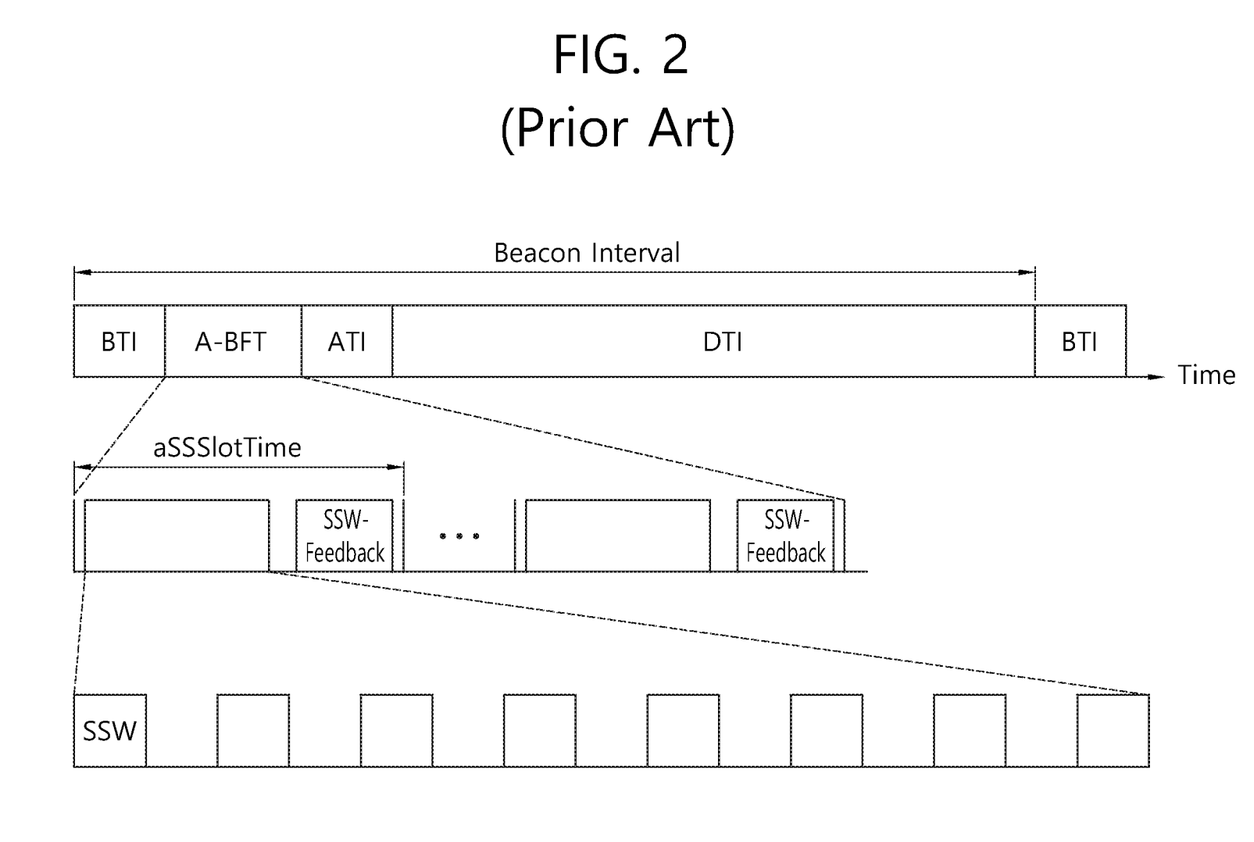
FIG. 2 is a diagram illustrating an example of a SLS process.

FIG. 2 is a diagram illustrating an example of a SLS process.

When an initiator is an AP and a responder is a non-AP STA, a beacon frame may be transmitted during the ISS process. A beacon interval may be a time period in which a beacon frame is transmitted.

A beacon transmission interval (BTI) may be a time interval between the start of a first beacon transmission by the AP in a beacon interval to the end of a last beacon transmission by the AP in the same beacon interval. An association beamforming training (A-BFT) may be a time period including a responder sector sweep (RSS) and a SSW feedback in the SLS process for beamforming (BF). An announcement transmission interval (ATI) may be a time interval for a request-response based management between the AP and the STA. A data transfer interval (DTI) may be a time interval for exchanging data.

The A-BFT is performed by a SSW slot unit, and a length of the A-BFT is defined as an integer multiple length of the SSW slot. A-BFT length information may be included in the beacon frame.

The SSW slot has a length of aSSSlotTime. The aSSSlotTime is defined as follows: aSSSlotTime=aAirPropagationTime+aSSDuration+MBIFS+aSSFBDuration+MBIFS. The aAirPropagationTime is a parameter considering the propagation delay between the initiator and the responder. The aSSDuration is a time for the responder to transmit M SSW frames in the SSW slot. Information about the number M of allowed SSW frames per a SSW slot may be included in the beacon frame. FIG. 2 is a diagram illustrating a case where M=8. Medium beamforming interframe spacing (MBIFS) represents an interval between the BTI and A-BFT or an interval between ISS, RSS, SSW feedback, and SSW ACK.

At the beginning of each A-BFT, the STA as the responder may invoke a random back-off process to strat or resume the RSS. At the beginning of the A-BFT, the STA may randomly select a backoff count from a uniform distribution [0, (A-BFT length−1)]. The STA decrements the backoff counter by one at the end of each SSW slot. The STA initiates RSS in the corresponding SSW slot when the back-off count value is 0 at the start of the SSW slot. In the corresponding SSW slot, the STA may transmit a maximum of M SSW frames. If there are more SSW frames sent by the STA, the RSS may be resumed in the next SSW slot before the A-BFT is finished. If the RSS is not completed before the A-BFT is finished, the backoff process may be performed again before the RSS is resumed in the next A-BFT.

The AP may send a SSW feedback before the SSW slot expires. The information included in the SSW feedback may be based on the SSW frame received in the SSW slot where the SSW feedback is transmitted. The SSW feedback may include information about a sector and an antenna which are selected by the AP.

The STA has an RSS fail count. Although the RSS fail count is performed during an A-BFT(s) period, the RSS fail count may be the number of consecutive times which do not receive the SSW feedback as a response. For example, it may be assumed that an A-BFT period has 8 SSW slots and the STA transmits SSW frames in 4 SSW slots for 2 A-BFT periods. If the STA does not receive the SSW feedback from 3 SSW slots of 4 SSW slots, the value of the RSS fail count may be 3.

When the value of the RSS fail count exceeds the RSS retry limit, the STA may select a random value selected from the uniform distribution [0, RSSBackoff) as a backoff count. The STA may decrement the backoff count by 1, one by one at the end of each A-BFT. When the backoff count reaches zero, the STA may resume the RSS in the A-BFT.

When the STA receives the SSW feedback during the A-BFT, the RSS fail count may be set to zero.

Figure 3:
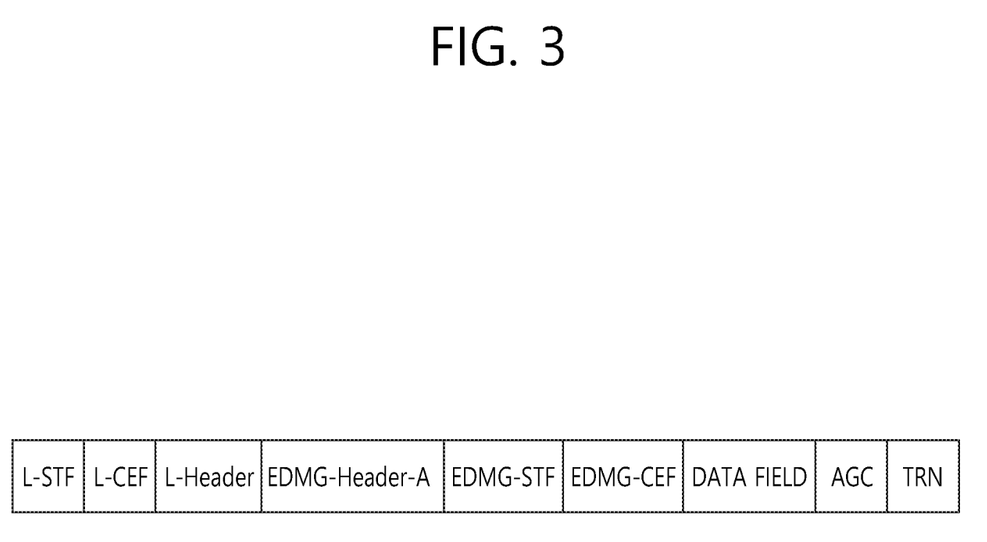
FIG. 3 is a diagram illustrating an example of the PPDU format for the proposed communication.

FIG. 3 is a diagram illustrating an example of the PPDU format for the proposed communication.

A Physical layer protocol data unit (PPDU) is a data block exchanged in two physical (PHY) entities. The PPDU may be also referred to as "enhanced directional multi-gigabit (EDMG) PPDU" to distinguish from an existing 802.11 b/g/n/ac based PPDU.

The EDMG PPDU may include a legacy short training field (L-STF), a legacy channel estimation field (L-CEF), a legacy header field (L-Header), an EDMG header A field (EDMG-Header-A), EDMG short training field (EDMG-STF), EDMG channel estimation field (EDMG-CEF), data field, automatic gain control field (AGC), and training sequences field (TRN). All fields may be not required. Some fields may be omitted and other fields may be added. For example, an EDMG-Header-B field next to an EDMG-CEF may be added.

L-STF may be composed of 16 times repetition of the sequence $Ga_{128}(n)$ of length 128 is defined as follows.

$$r_{STF}(nT_c) = \begin{cases} (Ga_{128}(n \bmod 128))\exp\left(j\pi\frac{n}{2}\right) & n = 0, 1, \ldots, 16 \times 128 - 1 \\ (-Ga_{128}(n \bmod 128))\exp\left(j\pi\frac{n}{2}\right) & n = 16 \times 128, \ldots, 17 \times 128 - 1 \end{cases}$$

[Equation 1]

L-CEF is used for channel estimation. The L-Header may include information about the reception of the data field. The L-Header may include an indication of the modulation and coding scheme (MCS), the length of the payload in the data field, and/or the presence of the EDMG-Header-A. The data field may include data for the user.

The EDMG-STF may be transmitted in one or more spatial streams, and the structure of the EDMG-STF may be varied according to the number of channels used. The EDMG-CEF may be transmitted in one or more spatial streams, and the structure of the EDMG-CEF may be varied according to the number of channels used.

The EDMG-Header-A may include a format field, a bandwidth field, and stream information. The format field indicates whether the corresponding PPDU is a single user PPDU or an multi-user (MU) PPDU. The bandwidth field indicates a bandwidth in which the corresponding PPDU is transmitted. The stream information indicates the number of spatial streams which are allocated to a receiving STA.

Figure 4:
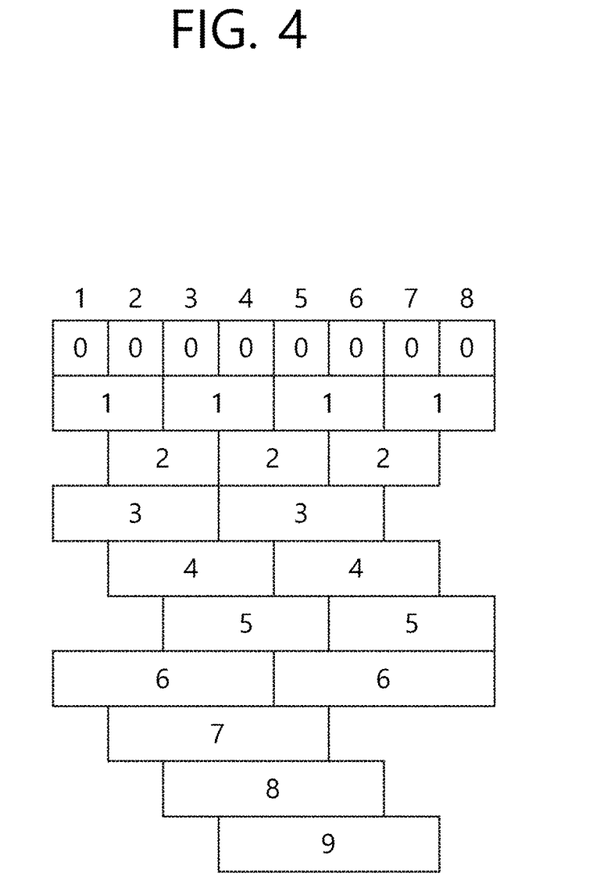
FIG. 4 is a diagram illustrating an example of channelization.

FIG. 4 is a diagram illustrating an example of channelization.

There are eight base channels. Although each of the eight base channels has a bandwidth of 2.16 GHz, there is no limitation on the number of base channels or the bandwidth. A plurality of base channels may be bonded to define a bonding channel. For example, a bonding channel with a bandwidth of 4.32 GHz may be defined by bonding two base channels. A bonding channel with a bandwidth of 6.48 GHz may be defined by bonding three base channels. A bonding channel with a bandwidth of 8.64 GHz may be defined by bonding four base channels.

The number in the box of FIG. 4 indicates the value of the bandwidth field. When the bandwidth field is '0', it indicates that the eight base channels are used without a bonding channel. When the bandwidth field is '4', it indicates that two bonding channels are used by bonding six base channels.

Currently, IEEE 802.11ay, which is being discussed, is considering multiple input multiple output (MIMO) support through array antennas. Furthermore, a support for multi user-multiple input multiple output (MU-MIMO) is also being discussed. In this case, BF training through a single array antenna of the existing IEEE 802.11 ad may be inefficient.

In the following embodiments, simultaneous BF training of beams for a plurality of channels and a plurality of STAs is proposed using one or more array antennas.

Each transmitting terminal may include one or more RF chains. The array antennas of the transmitting terminal may transmit one or more beams at the same time. One or more channels that are used for beam transmission may be defined. The array antenna may perform beamformings at the same time through one or more channels. The channels may be bonded.

Figure 5:
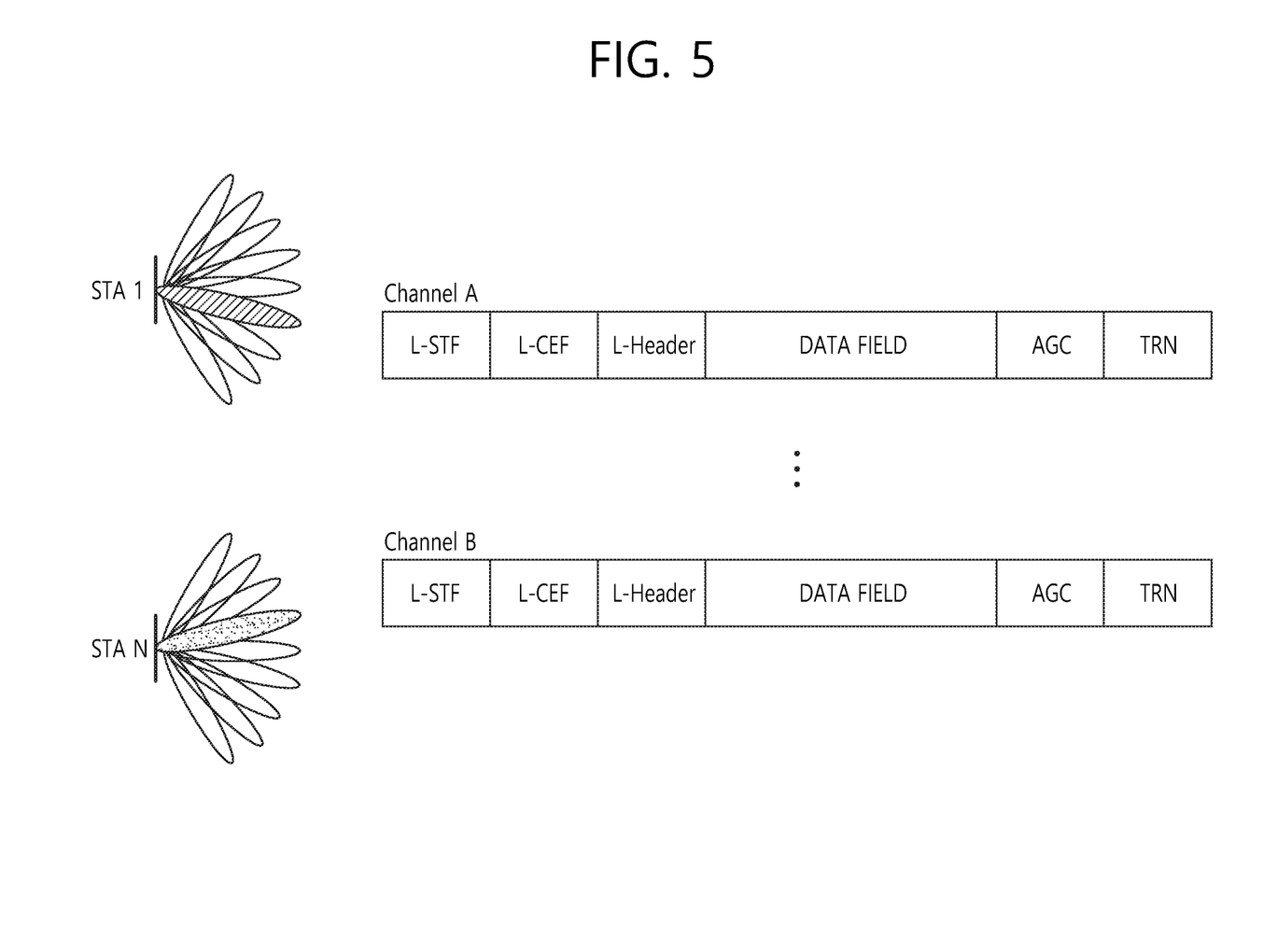
FIG. 5 is a diagram illustrating an example of a beamforming process.

FIG. 5 is a diagram illustrating an example of a beamforming process.

A plurality of STAs may simultaneously perform beamformings on a plurality of channels.

Each of the STAs may assign a unique ID to the beam (or sector) used in beamforming for each channel.

Each STA may identify the PPDU for beamforming on a specific channel by including information on a channel used for the corresponding PPDU and a sector ID.

Figure 6:
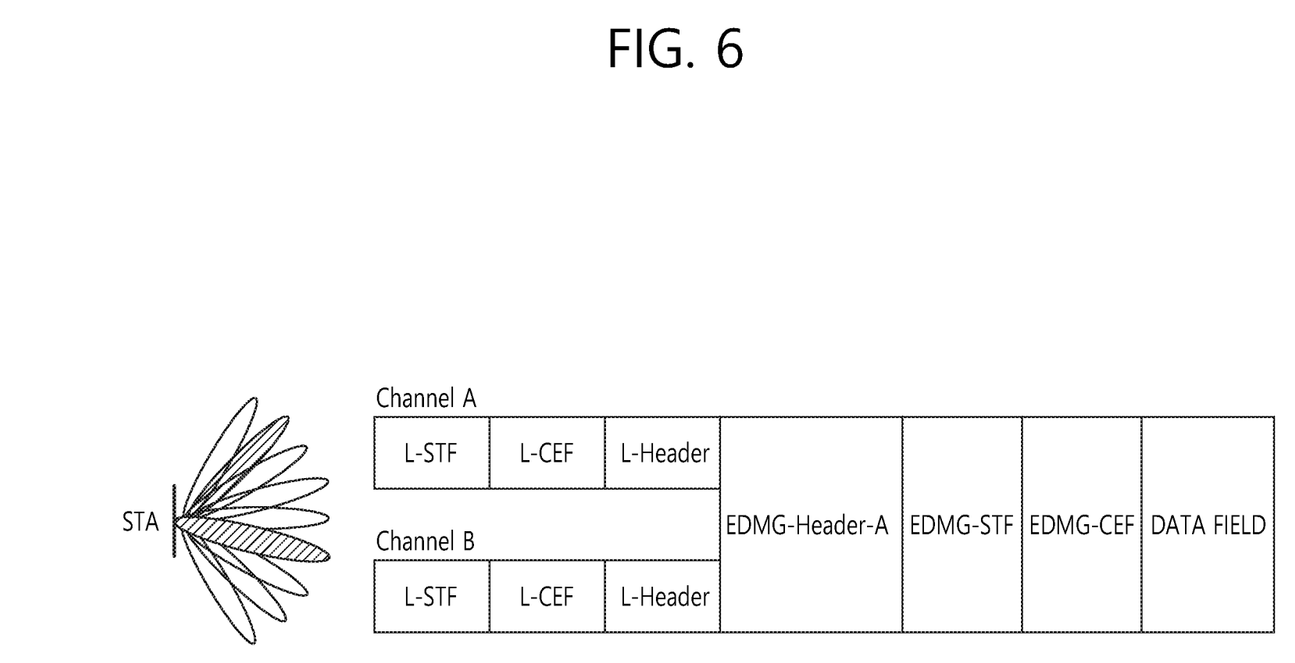
FIG. 6 is a diagram illustrating another example of the beamforming process.

FIG. 6 is a diagram illustrating another example of the beamforming process.

The STA may perform beamforming on a bonded channel. It may be assumed that the bonded channel includes channel A and channel B. The legacy preamble (L-STF, L-VEF, L-Header) may duplicately be transmitted in on channel A and channel B. The EDMG preamble (EDMG-Header-A, EDMG-STF, SDMG-CEF) and data field may be transmitted on the bonded channel.

Figure 7:
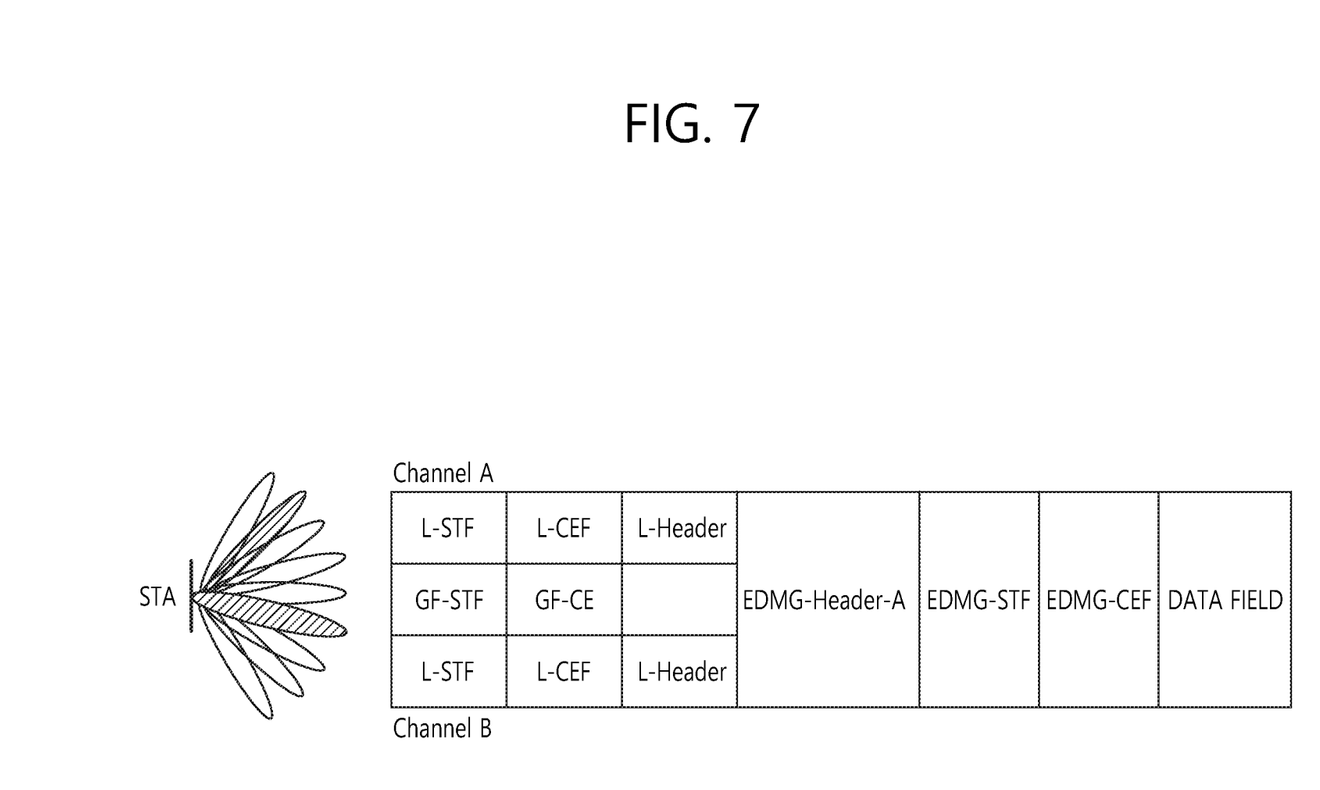
FIG. 7 is a diagram illustrating another example of the beamforming process.

FIG. 7 is a diagram illustrating another example of the beamforming process.

This is the case where there is a guard band between channel A and channel B. A green field-short training field (GF-STF) and a green field-channel estimation field (GF-CEF) may be transmitted in the guard band.

In a transmitting terminal capable of forming a plurality of beams, beams independent from each other may be generated to perform beamformings for a plurality of independent streams. The transmitting terminal may transmits a plurality of beams to each of the plurality of channels to simultaneously perform beamformings on the plurality of channels. The transmitting terminal may simultaneously perform beamformings for a plurality of receiving terminals.

Figure 8:
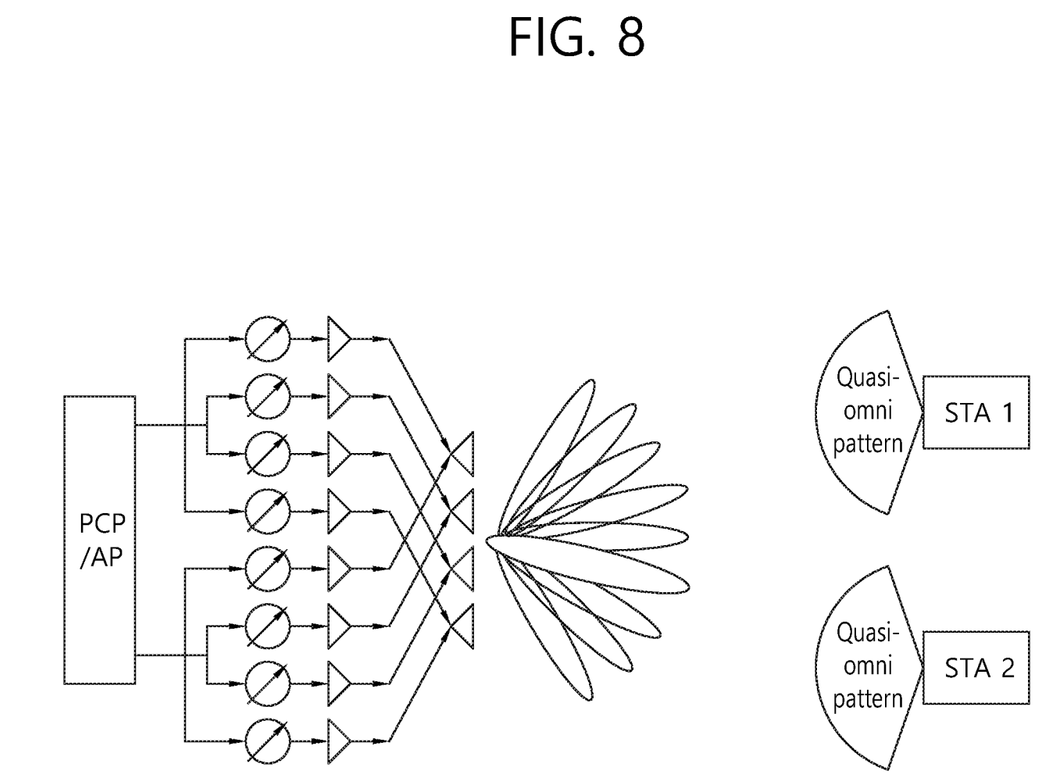
FIG. 8 is a diagram illustrating another example of the beamforming process.

FIG. 8 is a diagram illustrating another example of the beamforming process.

The AP may simultaneously perform beamformings to a plurality of STAs through a plurality of channels. Below, an exemplary embodiment of simultaneous beamforming between the AP and the STA will be described, but those skilled in the art may be able to apply the present embodiment to simultaneous beamforming between the AP and a plurality of STAs.

Below, a method of performing simultaneous beamforming training on multiple channels will be proposed.

Although two channels of channel A and channel B are considered, there is no limitation on the number of base channels or the bandwidth. Each of channels A and B may have a bandwidth of 2.16 GH, 4.32 GHz, 6.48 GHz, or 8.64 GHz. Channel A may be referred to as a "primary channel" and channel B may be referred to as a "secondary channel". One primary channel and one or more secondary channels may be defined within the BSS. The primary channel is a channel in which the beacon frame is transmitted.

Figure 9:
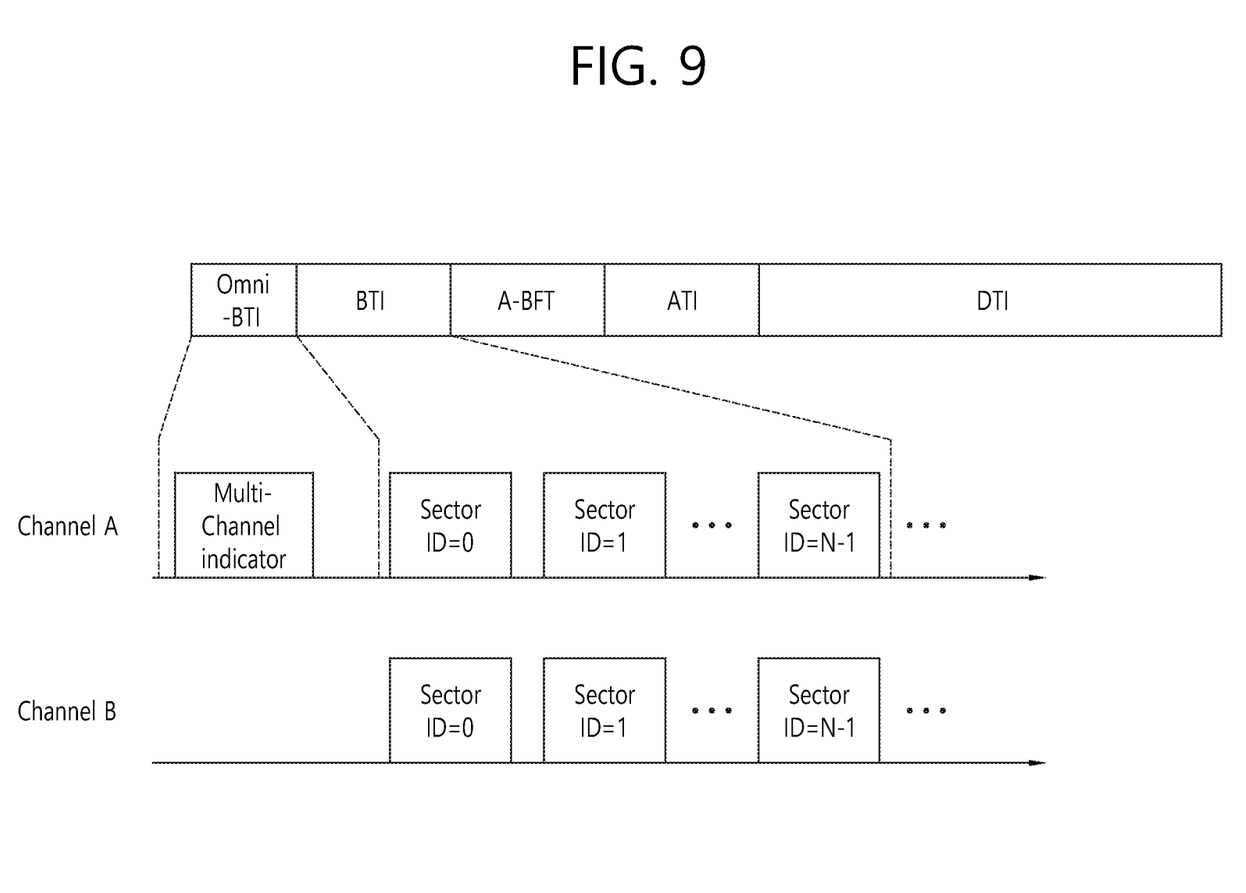
FIG. 9 is a diagram illustrating beamforming training according to an embodiment of the present invention.

FIG. 9 is a diagram illustrating beamforming training according to an embodiment of the present invention.

The omni-BTI may be added to the front of the SLS process. The initiator (e.g., AP) may send an omni-directional beacon frame to all responders during the omni-BTI. The beacon frame may be transmitted only on the primary channel.

The beacon frame may include a multi-channel indicator for beamforming training on multiple channels. The multi-channel indicator may indicate a plurality of channels used for BF training on the multiple channels. The plurality of channels may include one primary channel and one or more secondary channels. The multi-channel indicator may include information about the supported channel bandwidth and its set, the number of beams that can be simultaneously transmitted for multiple beamformings, and/or the polarization channel.

The multi-channel indicator may indicate that channel B as a secondary channel is used for BF training. The multi-channel indicator may indicate the position of the secondary channel based on the primary channel.

The multi-channel indicator may include information about whether the channel is bonded and/or information about the channel to be bonded. For example, the multi-channel indicator may indicate that third and fourth base channels of four base channels of FIG. 4 are bonded and used as a single bonding channel. The indicated bonding channel may be used as channel B.

During the BTI, the initiator may send a beacon frame for beamforming training on both channel A and channel B. The responder may identify that the beacon frame is transmitted on channel B during the BTI through the multi-channel indicator and the responder may receive the beacon frame on channel B.

Figure 10:
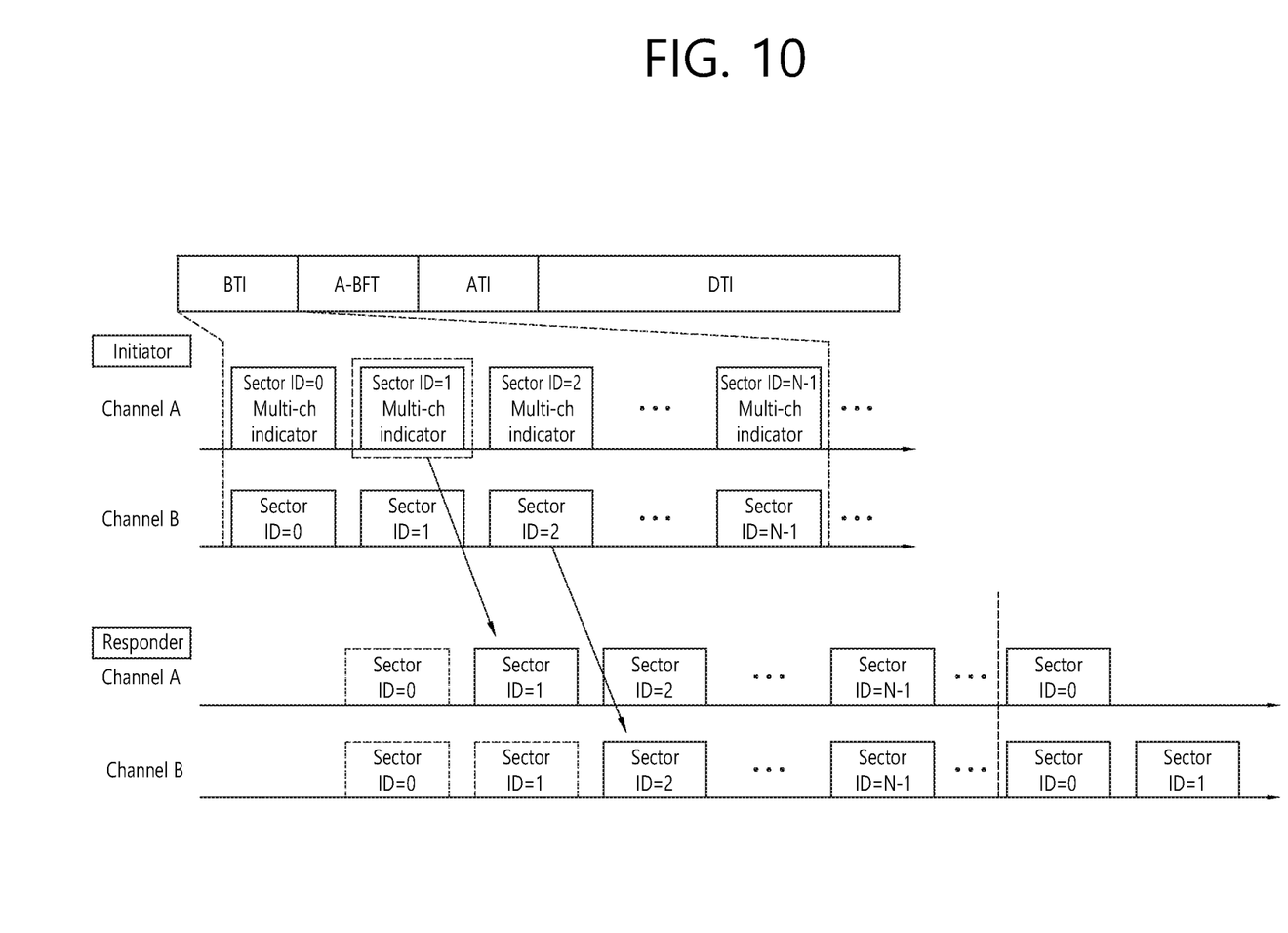
FIG. 10 is a diagram illustrating beamforming training according to another embodiment of the present invention.

FIG. 10 is a diagram illustrating beamforming training according to another embodiment of the present invention.

During the BTI, the initiator may send beacon frames for BF training through channel A and channel B, respectively. a beacon frame transmitted on channel A, which is the primary channel, may include a multi-channel indicator. The beacon frame is a directional beacon frame transmitted only to a specific responder.

During the BTI, a responder who receives the beacon frame on the primary channel may identify that BF training is also performed at the same time on channel B. For example, in the case that the responder receives a beacon frame with sector ID=1 on channel A, the responder who has identified that the beamforming (BF) training is also performed on channel B through the multi-channel indicator may initiate reception of a beacon frame on channel B.

In the case that the responder does not receive a beacon frame on all channels, an additional interval for BF training may be defined.

Figure 11:
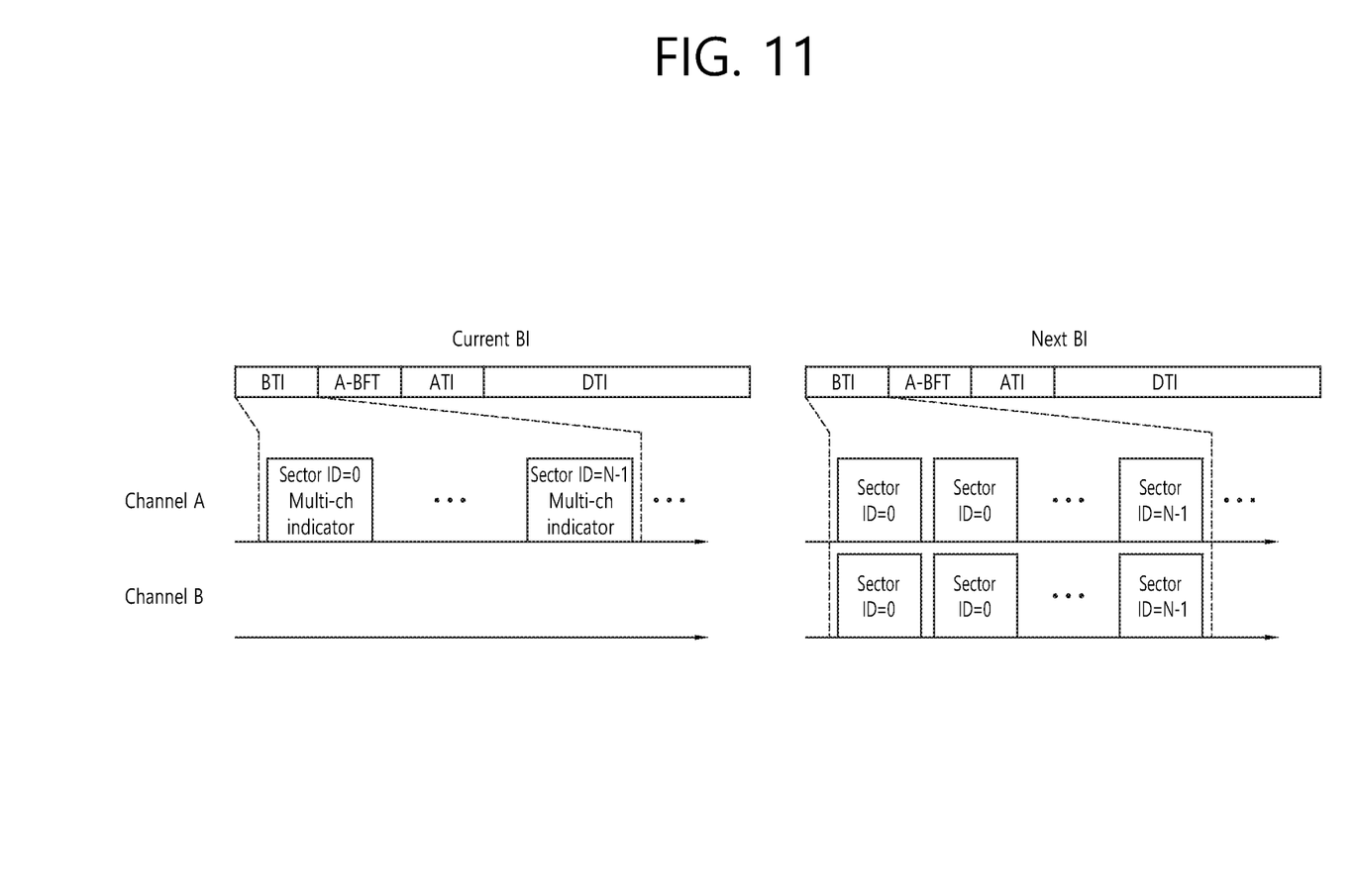
FIG. 11 is a diagram illustrating beamforming training according to another embodiment of the present invention.

FIG. 11 is a diagram illustrating beamforming training according to another embodiment of the present invention.

A beacon frame transmitted on a primary channel during the BTI in a current beacon interval (BI) may include a multi-channel indicator. A responder who receives the multi-channel indicator may perform beamforming training on both channel A and channel B in the next beacon interval (BI).

The multi-channel indicator may include offset information about whether the beamforming training is started through multiple channels. The multi-channel indicator may indicate that beamforming training begins on channel B in an $n^{th}$ ($n>=1$) beacon interval (BI).

Figure 12:
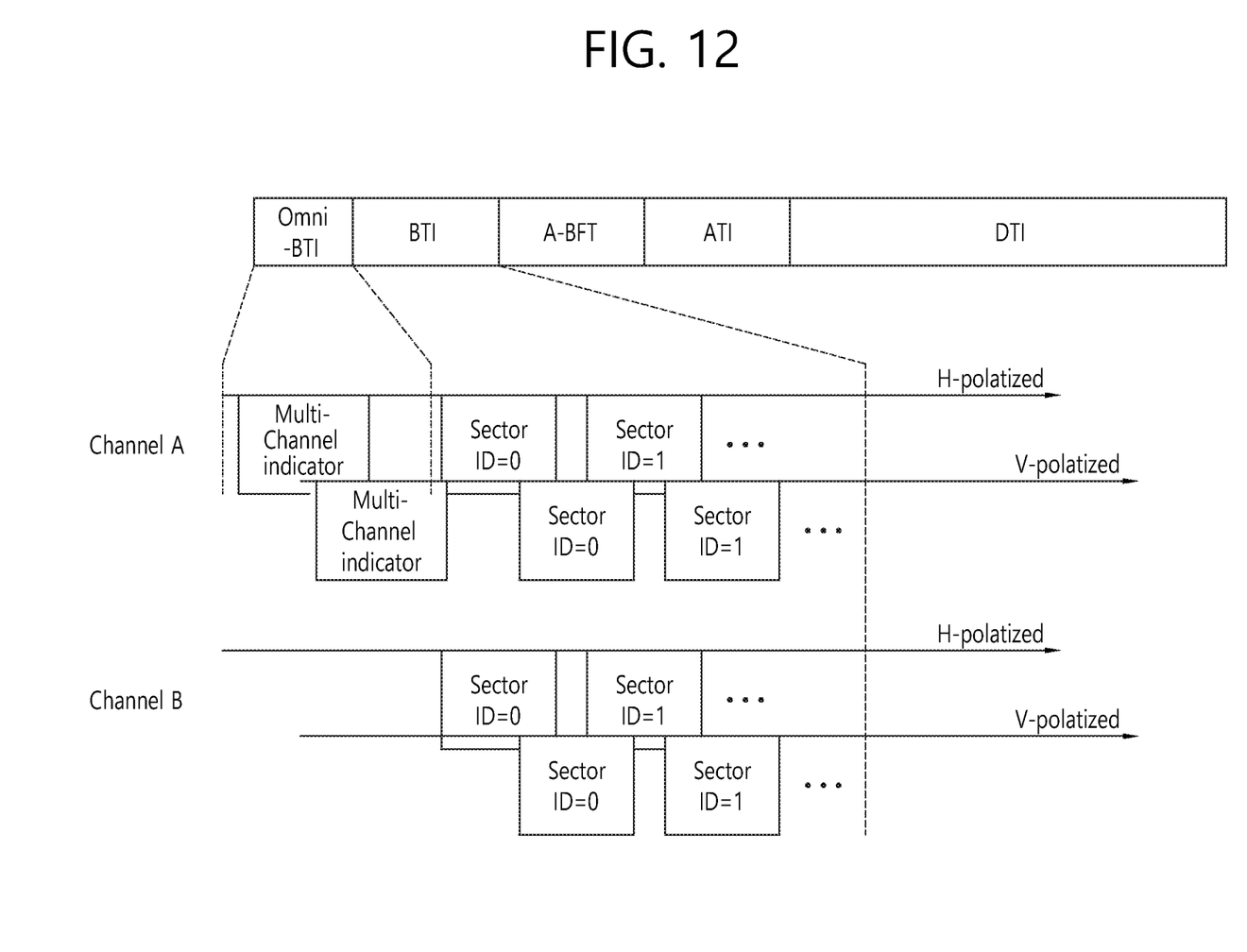
FIG. 12 is a diagram illustrating beamforming training according to another embodiment of the present invention.

FIG. 12 is a diagram illustrating beamforming training according to another embodiment of the present invention.

This is an example which uses polarization channels on channel A and channel B. For a transmitting antenna and a receiving antenna, the polarization relates to an orientation of the electric field of the electromagnetic (EM) waves. Polarization type indicates the orientation of the electric field emitted from an antenna. For example, the polarization type may be vertical polarization (VP), horizontal polarization (HP), left-hand circular polarization (LHCP), right-hand circular polarization (RHCP), etc.

For example, the initiator may transmit a first beacon frame on channel A through a HP type polarized beam and may transmit a second beacon frame through a VP type polarized beam. All beacon frames transmitted on channel A may include a multi-channel indicator. The initiator may transmit a third beacon frame through the HP type polarized beam on channel B and may transmit a fourth beacon frame through the VP type polarized beam on channel B.

Figure 13:
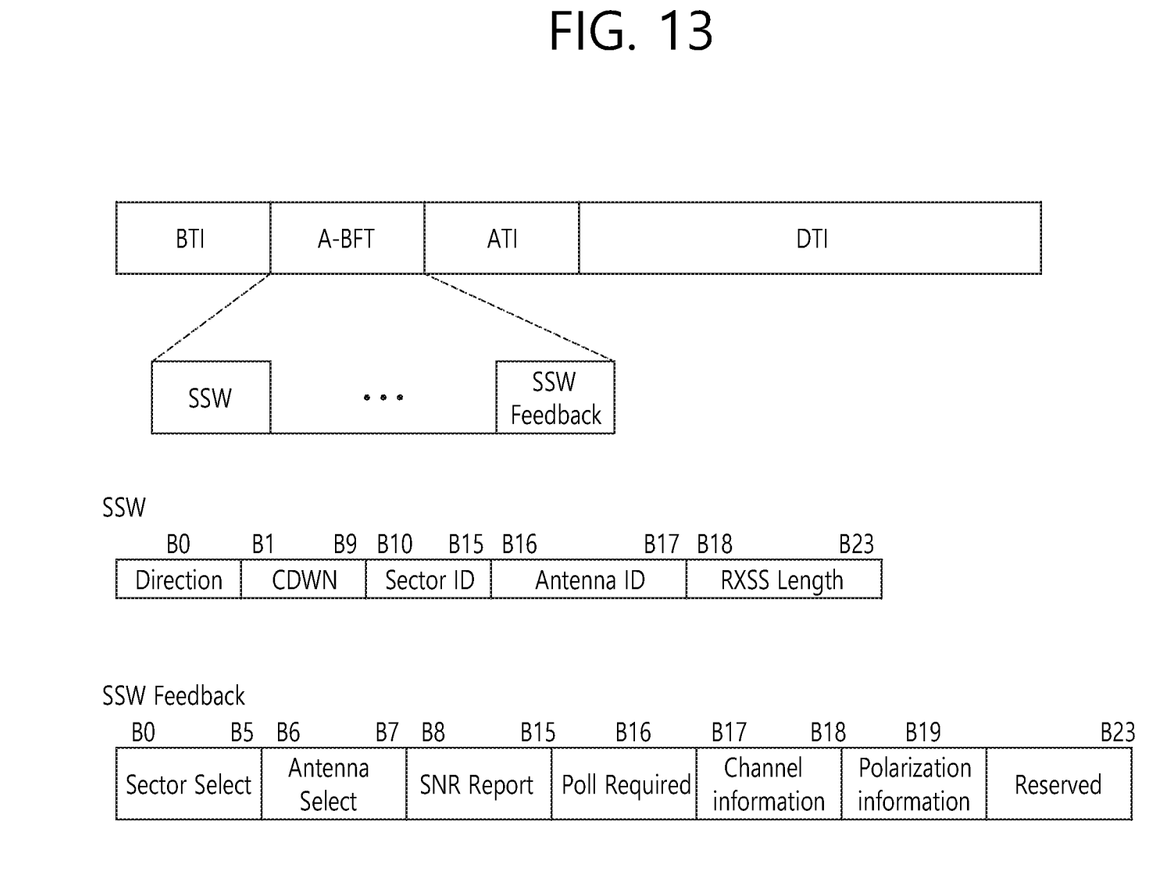
FIG. 13 is a diagram illustrating beamforming training according to another embodiment of the present invention.

FIG. 13 is a diagram illustrating beamforming training according to another embodiment of the present invention.

After performing a sector sweep using beacon frames on multiple channels during the initiator sector sweep (ISS) according to embodiments of FIGS. 9 to 12, an operation in the A-BFT is proposed. A SSW frame and a SSW feedback may be exchanged during BFT.

The SSW frame can include a Direction field, a count-down (CDOWN) field, a Sector ID field, Antenna ID field and a RXSS length field. The Direction field is set to 0 to indicate that the frame is transmitted by the beamforming initiator and set to 1 to indicate that the frame is transmitted by the beamforming responder. The CDOWN field is a down-counter indicating the number of the number of remaining SSW frame transmissions to the end of the TXSS/RXSS. This field is set to 0 in the last SSW frame transmission. The Sector ID field is set to indicate the sector number through which the frame containing this SSW frame is transmitted. The Antenna ID field indicates the antenna the transmitter is currently using for this transmission. The RXSS Length field specifies the length of a receive sector sweep as required by the transmitting STA.

If the initiator has a baseband, the same sector ID and antenna ID may be assigned for all channels. However, if the initiator has a plurality of basebands, it is necessary to inform a responder of a baseband, in which the corresponding SSW is transmitted. This embodiment proposes to classify basebands using a CDOWN value. For example, in the case that the a sector ID and an antenna ID of the SSW frame transmitted in a first baseband are S1 and A1 respectively and a sector ID and an antenna ID of the SSW frame transmitted in a second baseband are S2 and A2 respectively, sector ID (S1 or S2) and antenna ID (A1 or A2) described above may be defined as follows: S2=S1+2^(CDOWN), A2=A1+2^(CDOWN).

The SSW feedback can include a Sector Select field, an Antenna Select field, a SNR Report field, a Poll Required field, Channel information and/or Polarization information. The Sector Select field contains the value of the Sector ID subfield of the SSW field within the frame that was received with best quality in the immediately preceding sector sweep. The Antenna Select field indicates the value of the Antenna ID subfield of the SSW frame within the frame that was received with best quality in the immediately preceding sector sweep. The SNR Report field is set to the value of the SNR from the frame that was received with best quality during the immediately preceding sector sweep. The Poll Required field is set to 1 by a non-PCP/non-AP STA to indicate that it requires the PCP/AP to initiate communication with the non-PCP/non-AP. This field is set to 0 to indicate that the non-PCP/non-AP has no preference about whether the PCP/AP initiates the communication. This field is reserved when transmitted by a PCP/AP.

Channel information may indicate whether the SSW feedback belongs to a channel. Polarization information may exist when a polarization channel is used and may indicate a polarization type related to the SSW feedback.

Figure 14:
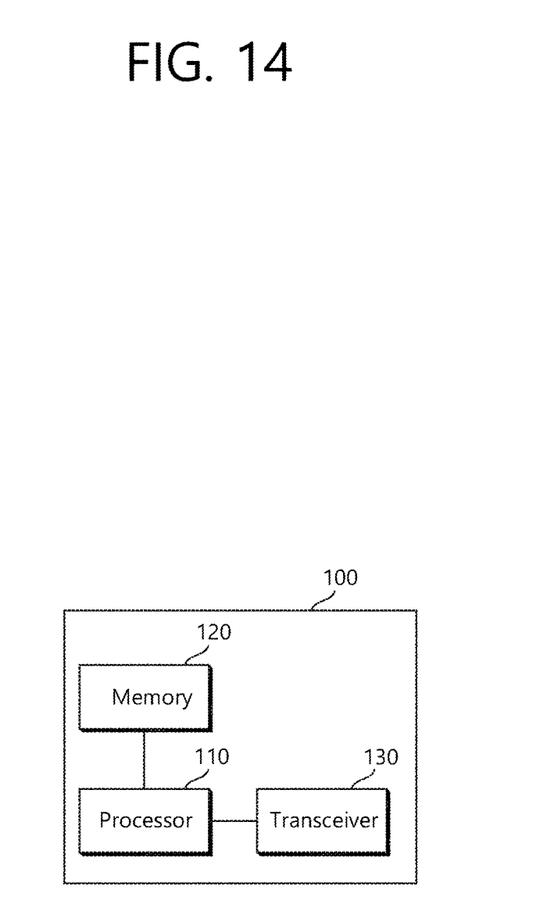
FIG. 14 is a block diagram illustrating a device in which an embodiment of the present invention is implemented.

FIG. 14 is a block diagram illustrating a device in which an embodiment of the present invention is implemented.

A device 100 may include a processor 110, a memory 120, and a transceiver 130.

The memory 120 may be coupled to the processor 110 and may store a variety of instructions that are executed by the processor 110. The transceiver 130 may be coupled to the processor 110 to transmit and/or receive radio signals. The processor 110 may implement a limited functionality, process, and/or method. The operation of the STA (an initiator or responder) may be implemented by the processor 110 according to an embodiment of the present invention. When the above-described embodiment is implemented in software instructions, the software instructions may be stored in the memory 120 and may be executed by the processor 110 to perform the operation described above.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the aforementioned exemplary systems, methods, but is described on the basis of the flowchart as a series of steps or blocks, the present invention is not limited to the order of the steps, which steps are described above as, can occur with other steps and in a different order or simultaneously. In addition, those skilled in the art will appreciate that the steps illustrated in the flow chart may be deleted without affecting the scope of, not exclusive, a different step, or contains one or more of the steps of the flow chart the present invention.

What is claimed is:

1. A method of performing a multi-beamforming training in a wireless local area network (LAN), the method comprising:
    transmitting, by an initiator, a first beacon frame for beamforming training on a first channel during a sector sweep;
    transmitting, by the initiator, a second beacon frame for beamforming training on the first channel or a second channel during the sector sweep,
    wherein the first beacon frame includes a multi-channel indicator indicating that the beamforming training is performed on the first and second channels, and
    wherein the first and second beacon frames are transmitted during a beacon transmission interval (BTI); and
    transmitting, by the initiator, a sector sweep (SSW) frame during an association beamforming training (A-BFT), which is subsequent to the BTI.

2. The method of claim 1, wherein the first beacon frame is an omni-directional beacon frame which is transmitted to all responders.

3. The method of claim 1, wherein the first beacon frame is a directional beacon frame which is transmitted to a specific responder.

4. The method of claim 1, wherein the multi-channel indicator comprises information indicating the second channel.

5. The method of claim 1, wherein the multi-channel indicator comprises offset information about a time when the second beacon frame begins to be transmitted on the second channel.

6. The method of claim 1,
    wherein the second channel is a bonding channel in which a plurality of base channels are bonded, and
    wherein the multi-channel indicator indicates which base channels among base channels in a system are bonded.

7. The method of claim 6, wherein each of the base channels has a bandwidth of 2.16 GHz.

8. A device for performing a multi-beamforming training in a wireless local area network (LAN), the device comprising:
    a transceiver configured to receive and transmit a radio signal; and
    a processor operatively coupled with the transceiver and configured to:
        transmit a first beacon frame for a beamforming training on a first channel during a sector sweep;
        transmit a second beacon frame for beamforming training on the first channel or a second channel during the sector sweep,
        wherein the first beacon frame includes a multi-channel indicator indicating that the beamforming training is performed on the first and second channels, and
        wherein the first and second beacon frames are transmitted during a beacon transmission interval (BTI); and
        transmitting a sector sweep (SSW) frame during an association beamforming training (A-BFT), which is subsequent to the BTI.

9. The device of claim 8, wherein the first beacon frame is an omni-directional beacon frame which is transmitted to all responders.

10. The device of claim 8, wherein the first beacon frame is a directional beacon frame which is transmitted to a specific responder.

11. The device of claim 8, wherein the multi-channel indicator comprises information indicating the second channel.

12. The device of claim 8, wherein the multi-channel indicator comprises offset information about a time when the second beacon frame begins to be transmitted on the second channel.

* * * * *